Nov. 1, 1932.   J. A. YANIZ Y DIAZ   1,885,668
VENTILATING DEVICE FOR VEHICLES
Filed Oct. 11, 1930

INVENTOR
Jose Agustin Yaniz Y Diaz
BY
Frederick Breitenfeld
ATTORNEY

Patented Nov. 1, 1932

1,885,668

UNITED STATES PATENT OFFICE

JOSE AGUSTIN YANIZ Y DIAZ, OF HABANA, CUBA

VENTILATING DEVICE FOR VEHICLES

Application filed October 11, 1930, Serial No. 488,180, and in Cuba August 8, 1930.

My present invention relates generally to vehicles, especially motor vehicles, and has particular reference to a ventilating device.

Although I have herein illustrated and shall hereinafter describe my invention as applied to an ordinary automobile, nevertheless it will be understood that as to certain phases of my invention it may not be restricted to this specific purpose or type of vehicle.

A general object of my invention is to provide a device for ventilating those portions of a vehicle, such as an automobile, which are relatively enclosed, and which are customarily subjected to overheating, or, in connection with which, for other reasons, it may be desirable to provide ventilation.

In the specific embodiment herein illustrated by way of example, I have shown a ventilating device of the present character associated with an automobile for the purpose of cooling and ventilating the space immediately over the floor board adjacent to the engine.

A more specific object of my invention is to provide a device for accomplishing the foregoing objects in a simple and expeditious manner, the device being composed of relatively few and inexpensive parts and being, if desired, totally devoid of any moving or complicated mechanism, such as vanes or the like.

A particular feature of my invention lies in harnessing for the present purpose the characteristics of a chimney or draft flue. More particularly, my device includes an elongated conduit which is arranged lengthwise of the vehicle and which is so constructed as to induce a draft therethrough which accomplishes the desired ventilation.

A further feature of my invention lies in providing an arrangement whereby the ordinary exhaust discharge of a motor vehicle may, if desired, be advantageously adapted for the purpose of enhancing the contemplated draft.

I achieve the foregoing objects, and such other objects as may hereinafter appear or be pointed out, in the manner illustratively exemplified in the accompanying drawing, wherein—

Figure 1:
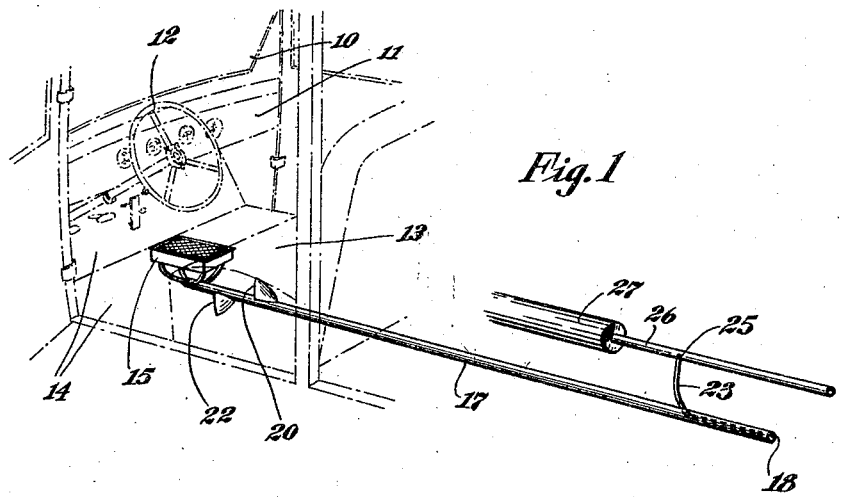
Figure 1 is a perspective view of my ventilating device, showing the same in association with a motor vehicle, portions of which are shown in dot-and-dash lines.

In Figure 1, I have illustratively shown the relatively enclosed portion of a vehicle immediately behind the engine. Underneath the windshield 10 is the customary instrument board 11, and underneath the latter are control pedals and the like. A steering wheel 12 usually projects upwardly in the manner shown for access by the driver who sits upon the seat 13. It is well known that the floor board or boards 14 are subjected to overheating because of the proximity of the motor, and, as a result of this, the space above these floor boards becomes hot and stuffy, and it is highly desirable to renew the heated and foul air which collects.

Figure 2:
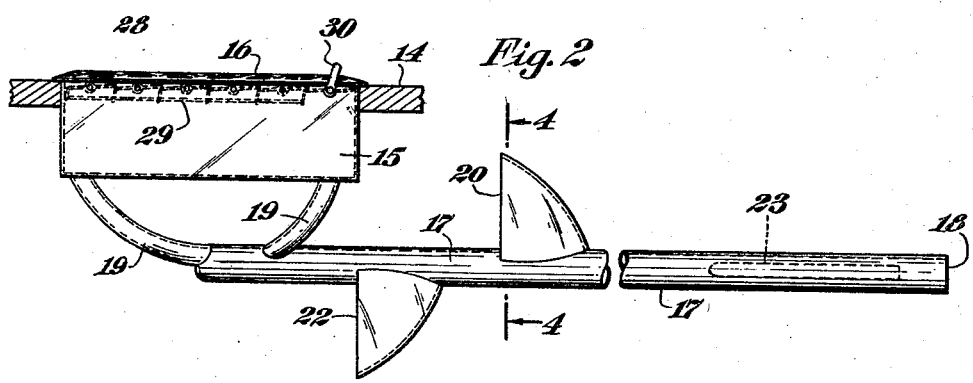
Figure 2 is an enlarged elevational view of my device shown by itself, a portion being broken away for the sake of compactness.
Figure 3:
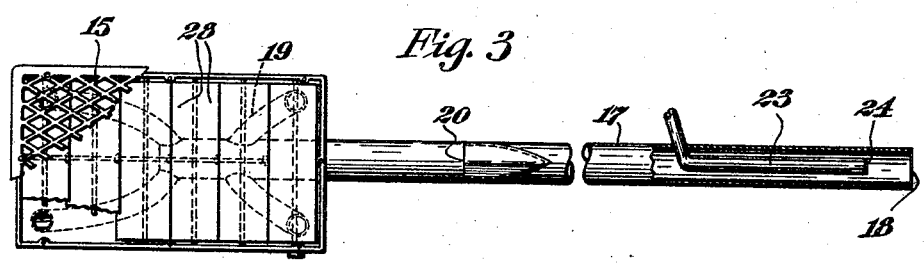
Figure 3 is a plan view of Figure 2.

In accordance with my present invention, I provide a chamber 15 in association with the floor board 14, the chamber having enclosed walls on the sides and bottom and having a grating plate or the like 16 arranged on its upper surface. This grating may advantageously be arranged in a substantially flush relationship with the floor board 14, as shown most clearly in Figure 2. The chamber is thus in communication with the relatively enclosed space over the floor board 14.

A conduit 17 is arranged lengthwise of the vehicle, and in the illustrated form I have shown the same positioned underneath the car. The rear end 18 of the conduit 17 is open to the atmosphere, and the forward end of the conduit communicates with the chamber 15. I have illustratively shown a plurality of communicating pipes 19 extending upwardly into communication with the chamber 15, but it is obvious that any desired construction of the parts may be provided, the chamber 15 being, in effect, an enlarged forward portion of the entire conduit.

By virtue of the movement of the vehicle, a draft is induced in the conduit 17, and this draft will withdraw the heated air from above the chamber 15 and discharge the same through the rear end 18 of the conduit. If desired, the conduit may be arranged at the upper portion of the body of the car, or elsewhere, instead of underneath the car, although I prefer the arrangement illustrated.

Figure 4:
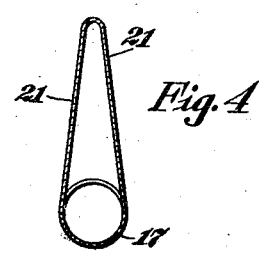
Figure 4 is an enlarged cross-sectional view taken substantially along the line 4—4 of Figure 2.

To enhance the draft through the conduit 17 I provide a series of draft-inducing ports at spaced intervals along the conduit and in communication with the atmosphere. I have illustratively shown two such ports. The port 20 is provided on the upper wall of the conduit 17, and it is to be noted that this port is in the nature of a funnel, having the tapering side walls 21 which merge with the conduit 17, as shown most clearly in Figure 4. The walls 21 join together at the rear, thereby providing an opening which faces in a forward direction. This opening communicates with the external air underneath the vehicle, and, as a result of this, the forward movement of the vehicle will induce atmospheric air to enter the conduit 17 through the port 20. This entrance of air will induce and enhance a rearwardly directed draft through the conduit 17.

I have shown another similar draft-inducing port 22 on the lower wall of the conduit 17, and it will be understood that these ports may be arranged at desired intervals to suit requirements.

I have also shown the manner in which the exhaust of the motor may be employed to induce a draft in the conduit 17. An aspirating tube 23 is arranged within the rear portion of the conduit 17 and is directed rearwardly. The rear end 24 is thus open, and it is to be noted that it is positioned within the confines of the conduit 17. The opposite end of the tube 23 connects, as at 25, with the exhaust tube 26 of the engine, the latter having been shown emerging from the customary muffler 27. Some of the gases that are discharged through the mufflers 27 will pass through the aspirating tube 23, and in discharging from the end 24 of the latter they will induce a rearward draft in the conduit 17.

I have also shown one way in which the conduit of the present invention may, if desired, be closed or sealed at its forward end under certain conditions. A set of louvers or vanes 28 are pivotally mounted in the chamber 15 beneath the grating plate. These louvers are preferably articulated to a common rod 29, so that when the pivoted control member 30 is actuated, as, for example, by the foot of a user, the louvers 28 may be brought into alignment to close the chamber 15; or they may be swung into approximately 90° to open the passageway.

It will be obvious that a number of the details herein described may be varied to suit differing requirements. For example, the chamber 15 may be constructed in the form of an inverted cone which merges at its apex with the conduit herein designated by the reference numeral 17. Also, the shape or nature of the chamber 15 may be altered to suit differing positions thereof; and it will be understood that my invention does not necessitate positioning this chamber in association with the specific floor board designated by the reference numeral 14.

Furthermore, where the exhaust is utilized in the manner herein described for the purpose of inducing a draft, greater precision in the control of the amount of pressure or suction from the exhaust pipe may be attained by arranging a petcock or valve on the exhaust pipe near the outlet end.

In general, it will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In a vehicle having a relatively enclosed portion, a ventilating device for said enclosed portion comprising a conduit extending lengthwise of the vehicle with its rear end open to the atmosphere and its forward end opening into said enclosed portion; and means arranged at spaced intervals along said conduit for inducing a draft through the latter.

2. In a vehicle having a relatively enclosed portion, a ventilating device for said enclosed portion comprising a conduit extending lengthwise of the vehicle with its rear end open to the atmosphere and its forward end opening into said enclosed portion; said conduit being provided with a series of draft-inducing ports communicating with the atmosphere.

3. In a vehicle having a relatively enclosed portion, a ventilating device for said enclosed portion comprising a conduit extending lengthwise of the vehicle with its rear end open to the atmosphere and its forward end opening into said enclosed portion; said conduit being provided with forwardly directed draft-inducing ports open to the external air.

4. In a vehicle having a relatively enclosed portion, a ventilating device for said enclosed portion comprising a conduit extending lengthwise of the vehicle with its rear end open to the atmosphere and its forward end opening into said enclosed portion; said conduit being provided with a series of draft-inducing ports communicating with the atmosphere, and also with an aspirating tube in the rear end of the conduit.

In witness whereof I have signed and sealed this specification this 2nd day of October, 1930.

JOSE AGUSTIN YANIZ Y DIAZ.